(12) United States Patent
Zapf et al.

(10) Patent No.: US 12,226,734 B2
(45) Date of Patent: Feb. 18, 2025

(54) FILTER MEDIUM FOR SEPARATING NITROGEN OXIDES

(71) Applicant: MANN+HUMMEL GmbH, Ludwigsburg (DE)

(72) Inventors: Simon Zapf, Bamberg (DE); Volkmar Chowanietz, Bayreuth (DE); Christoph Hitzke, Bamberg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 818 days.

(21) Appl. No.: 17/403,308

(22) Filed: Aug. 16, 2021

(65) Prior Publication Data

US 2022/0032232 A1 Feb. 3, 2022

Related U.S. Application Data

(63) Continuation of application No. PCT/EP2020/054222, filed on Feb. 18, 2020.

(30) Foreign Application Priority Data

Feb. 19, 2019 (DE) .................. 10 2019 104 148.1

(51) Int. Cl.
  *B01D 53/82* (2006.01)
  *B01D 39/16* (2006.01)
  (Continued)

(52) U.S. Cl.
  CPC ......... *B01D 53/82* (2013.01); *B01D 39/1623* (2013.01); *B01D 39/2062* (2013.01); *B01D 39/2079* (2013.01); *B01D 53/44* (2013.01); *B01D 53/565* (2013.01); *B01J 20/041* (2013.01); *B01J 20/08* (2013.01); *B01J 20/20* (2013.01); *B01J 20/261* (2013.01); *B01J 20/262* (2013.01); *B01J 20/28035* (2013.01); *B01J 20/28038* (2013.01); *B01J 20/28061* (2013.01); *B01J 20/28064* (2013.01); *B01J 20/28066* (2013.01); *B01D 2239/0407* (2013.01);
(Continued)

(58) Field of Classification Search
None
See application file for complete search history.

(56) References Cited

U.S. PATENT DOCUMENTS 3,957,059 A 5/1976 Rainer
5,772,738 A 6/1998 Muraoka
(Continued)

FOREIGN PATENT DOCUMENTS

| CN | 103212245 A | 7/2013 |
| WO | 02066272 A2 | 8/2002 |
| WO | 17216611 A1 | 12/2017 |

*Primary Examiner* — Jelitza M Perez (57) ABSTRACT

A filter medium is provided with a layer (A) provided with non-impregnated active carbon, a layer (B) with a solid carrier material that is impregnated with a permanganate salt, and a layer (C) with alkaline impregnated active carbon. The layer (B) and the layer (C) are arranged such that a gas flowing through the filter medium flows through the layer (B) before flowing through the layer (C). The layer (A) is arranged such that the gas flowing through the filter medium flows through the layer (A) before flowing through the layer (B) or the gas flowing through the filter medium flows through the layer (A) after flowing through the layer (C).

18 Claims, 2 Drawing Sheets

(51) Int. Cl.
- *B01D 39/20* (2006.01)
- *B01D 53/44* (2006.01)
- *B01D 53/56* (2006.01)
- *B01J 20/04* (2006.01)
- *B01J 20/08* (2006.01)
- *B01J 20/20* (2006.01)
- *B01J 20/26* (2006.01)
- *B01J 20/28* (2006.01)

(52) U.S. Cl.
CPC ............ *B01D 2239/0464* (2013.01); *B01D 2239/0618* (2013.01); *B01D 2239/065* (2013.01); *B01D 2239/083* (2013.01); *B01D 2239/10* (2013.01); *B01D 2239/1241* (2013.01); *B01D 2239/1291* (2013.01); *B01D 2253/102* (2013.01); *B01D 2253/25* (2013.01); *B01D 2253/304* (2013.01); *B01D 2253/306* (2013.01); *B01D 2257/404* (2013.01); *B01D 2257/708* (2013.01)

(56) References Cited

U.S. PATENT DOCUMENTS

| | | |
|---|---|---|
| 6,004,381 A | 12/1999 | Rohrbach et al. |
| 6,019,676 A | 2/2000 | Kim |
| 6,156,089 A * | 12/2000 | Stemmer ............ B01D 46/0036 55/467 |
| 2004/0146436 A1* | 7/2004 | Ham ................ B01D 53/0407 422/177 |
| 2018/0065070 A1 | 3/2018 | Merz et al. |
| 2018/0169559 A1* | 6/2018 | Kloss .................. B01D 46/522 |
| 2019/0001253 A1 | 1/2019 | Hitzke et al. |

* cited by examiner

FILTER MEDIUM FOR SEPARATING NITROGEN OXIDES

CROSS-REFERENCE TO RELATED APPLICATIONS

This application is a continuation application of international application No. PCT/EP2020/054222 having an international filing date of 18 Feb. 2020 and designating the United States, the international application claiming a priority date of 19 Feb. 2019 based on prior filed German patent application No. 10 2019 104 148.1, the entire contents of the aforesaid international application and the aforesaid German patent application being incorporated herein by reference.

BACKGROUND OF THE INVENTION

The present invention concerns a filter medium for separating nitrogen oxides from a gas mixture such as ambient air. In particular, the present invention concerns a filter medium for separating nitrogen oxides from a gas mixture such as ambient air, wherein the filter medium comprises three layers that contain different adsorbent materials.

Worldwide, in many metropolitan areas there is the problem that the ambient air can surpass many times over the limit values for particulate matter and/or harmful gases such as ozone, NOR, CO due to industrial exhaust gases, the traffic, and private fireplaces, primarily in adverse weather conditions (little or no rain, inversion, minimal wind speeds, no air exchange between altitude layers). Measures that lead to a reduction of the pollutant concentrations can reside either in avoiding or reducing emissions and/or the separation of these pollutants from the ambient air. The avoidance or reduction of emissions in general requires a widespread realization of a concept of measures and therefore can be hardly realized in short time. The separation of pollutants from the ambient air could be achieved depending on individual need in living and common spaces of daily life and in particular also by use of suitable filter systems in an environment that is strongly loaded with pollutants. For example, the pollutant concentration in the ambient air in the interior of automobiles that, in metropolitan areas, move inevitably in an environment that is strongly loaded with pollutants could be reduced by suitable filters, wherein the separation of particulate matter and nitrogen oxides is of particular interest.

WO 17/216611 A1 describes a device for cleaning ambient air by separation of suspended solid particles such as dust, sand, pollen, particles with an aerodynamic diameter of less than 10 μm or less than 2.5 μm, such as elemental carbon and organic carbon, as well as gases such as hydrocarbons, carbon monoxide, nitrogen oxides, sulfur oxides, and ammonia.

DE 10 2018 114 351 A1 describes a filter medium comprising at least one catalytic active layer comprising catalytic active carbon, a second active layer comprising impregnated or catalytic active carbon particles, a third active layer comprising impregnated or catalytic active carbon particles, wherein at least one active layer comprises impregnated active carbon particles and the three layers are different among each other. The filter medium adsorbs n-butane, volatile organic hydrocarbon compounds, $SO_2$, $H_2S$, $NH_3$, and formaldehyde.

In particular when the undesirable components of the gas mixture are molecules that are separable by physisorption only to a minimal degree, it is required in general for a highly efficient separation to retain these undesirable molecular components by chemisorption in the filter medium. This requires suitable chemisorption agents.

Despite the research work disclosed in the prior art, there is the continuous need to provide filter media that are suitable for separating partially or completely undesirable components, in particular nitrogen oxides, from a gas mixture, in particular ambient air. On the one hand, the filter media should cause a pressure loss as low as possible in the gas flow to be purified. This requires in general that the filter media remove the undesirable components of the gas mixture in a highly efficient manner from the gas stream at least partially, preferably however as completely as possible, so that the filter media can be used in minimal layer thicknesses. On the other hand, inexpensive agents that are easy to handle should be used in the filter media.

With the present invention, a solution to this problem is provided.

SUMMARY OF THE INVENTION

According to a first aspect of the invention, a filter medium is provided that comprises the layers (A) to (C), wherein
  the layer (A) comprises non-impregnated active carbon,
  the layer (B) comprises a solid carrier material that is impregnated with a permanganate salt, and
  the layer (C) comprises alkaline impregnated active carbon, wherein
  the layers (B) and (C) are arranged such that a gas flowing through the filter medium flows through the layer (B) before flowing through the layer (C) and
  the layer (A) is arranged such that a gas flowing through the filter medium flows through the layer (A) before flowing through layer (B) or through the layer (A) after flowing through the layer (C).

The advantage of a non-impregnated active carbon in layer A provided at the inflow side resides in VOC adsorption (aliphatic hydrocarbons, aromatics, aldehydes etc.). In this way, the filter medium according to the invention has particularly advantageous $NO_x$ adsorption properties but the ambient air in the situation of use (e.g. interior filters for vehicles or ambient air filtration device) is also contaminated with hydrocarbons. The upstream non-impregnated active carbon ensures thus the VOC adsorption and prevents a co-adsorption of VOCs and nitrogen oxides in the layers (B) and (C) that follow in flow directions so that these two layers can act particularly $NO_x$ selective.

According to a further aspect of the invention, a method for producing a filter medium according to the first aspect of the invention is provided that comprises the following steps:
  (i) applying a layer (A) comprising active carbon;
  (ii) applying a layer (B) comprising a solid carrier material that is impregnated with a permanganate salt;
  (iii) applying a layer (C) comprising an alkaline impregnated active carbon,
  when the layer (A) is arranged such that a gas flowing through the filter medium flows through the layer (A) before flowing through layer (B); or comprising the steps:
  (i) applying a layer (B) comprising a solid carrier material that is impregnated with a permanganate salt;
  (ii) applying a layer (C) comprising an alkaline impregnated active carbon;
  (iii) applying a layer (A) comprising active carbon;
  when the layer (A) is arranged such that a gas flowing through the filter medium flows through the layer (A) after flowing through the layer (C); so that the layers (B) and (C) are arranged such that a gas flowing through the filter medium flows through the layer (B) before flowing through the layer (C)

the layer (A) is arranged such that a gas flowing through the filter medium flows through the layer (A) before flowing through the layer (B) or through the layer (A) after flowing through the layer (C).

In this context, the invention comprises the following embodiments.

(1) Filter medium comprising three layers (A) to (C), wherein the layer (A) comprises active carbon, the layer (B) comprises a solid carrier material that is impregnated with a permanganate salt, and the layer (C) comprises alkaline impregnated active carbon, wherein the layers (B) and (C) are arranged such that a gas flowing through the filter medium flows through the layer (B) before flowing through the layer (C), and the layer (A) is arranged such that a gas flowing through the filter medium flows through the layer (A) before flowing through the layer (B) or through the layer (A) after flowing through the layer (C).

(2) Filter medium according to embodiment (1), wherein each of the layers (A) to (C) comprises a different composition.

(3) Filter medium according to embodiment (1) or embodiment (2), wherein one, two, or each individual one of the layer (A) to (C) comprises an agent for stabilization of the layer.

(4) Filter medium according to embodiment (3), wherein two or more of the layers (A) to (C) comprises an agent for stabilization of the layer and the same agent for stabilization of the layer or different agents for stabilizing are present in the two or more layers.

(5) Filter medium according to the embodiment (3) or the embodiment (4), wherein the agent for stabilization of the layer is selected from an adhesive, a carrier layer, and a combination thereof.

(6) Filter medium according to embodiment (5), wherein the agent for stabilization of the layer is a carrier layer.

(7) Filter medium according to embodiment (6), wherein the carrier layer is a textile carrier layer.

(8) Filter medium according to embodiment (7), wherein the carrier layer is a nonwoven.

(9) Filter medium according to embodiment (8), wherein the nonwoven is comprised of polymer fibers, wherein the polymer is selected from polyurethane, polyester, polypropylene, polyethylene, polyamide, polyacrylonitrile, polycarbonate, and combinations thereof.

(10) Filter medium according to one of the embodiments (1)-(9), wherein the layers (A) to (C) are arranged such that a gas flowing through the filter medium flows through the layer (A) before flowing through the layer (B) and through the layer (B) before flowing through the layer (C).

(11) Filter medium according to one of the embodiments (1)-(9), wherein the layers (A) to (C) are arranged such that a gas flowing through the filter medium flows through the layer (B) before flowing through the layer (C) and through the layer (C) before flowing through the layer (A).

(12) Filter medium according to one of the embodiments (1)-(11), wherein the layer (A) comprises active carbon but no carrier material that is impregnated with a permanganate salt and no alkaline impregnated active carbon;

the layer (B) comprises a solid carrier material that is impregnated with a permanganate salt but no non-impregnated active carbon and no alkaline impregnated active carbon;

the layer (C) comprises alkaline impregnated active carbon but no carrier material that is impregnated with a permanganate salt and no non-impregnated active carbon.

(13) Filter medium according to one of the embodiments (1)-(12), wherein the layer (A) is comprised of a non-impregnated active carbon and an agent for stabilization of the layer;

the layer (B) is comprised of a solid carrier material and an agent for stabilization of the layer that is impregnated with a permanganate salt;

the layer (C) is comprised of alkaline impregnated active carbon and an agent for stabilization of the layer.

(14) Filter medium according to one of the embodiments (1)-(13), wherein the layer (A) comprises a grammage of 50 to 600 g/m$^2$.

(15) Filter medium according to embodiment (14), wherein the layer (A) has a grammage of 100 to 500 g/m$^2$, preferably 150 to 400 g/m$^2$, more preferred 200 to 300 g/m$^2$.

(16) Filter medium according to one of the embodiments (1)-(15), wherein the active carbon in layer (A) comprises a grain size of 10 to 80 mesh.

(17) Filter medium according to embodiment (16), wherein the active carbon in layer (A) comprises a grain size of 30 to 60 mesh.

(18) Filter medium according to one of the embodiments (1)-(17), wherein the active carbon in layer (A) comprises a BET surface area of 300-1,500 m$^2$/g, in particular 500-1,500 m$^2$/g.

(19) Filter medium according to one of the embodiments (1)-(18), wherein the solid carrier material of the layer (B) is selected from aluminum oxide ($Al_2O_3$), silica gel ($SiO_2$), zirconium oxide ($ZrO_2$), titanium oxide ($TiO_2$), zeolite, kaolin, clay, bauxite, and a combination thereof.

(20) Filter medium according to embodiment (19), wherein the solid carrier material of the layer (B) that is impregnated with a permanganate salt is $Al_2O_3$.

(21) Filter medium according to one of the embodiments (1)-(20), wherein the solid carrier material of the layer (B) comprises a grain size of 100 to 5,000 µm.

(22) Filter medium according to embodiment (21), wherein the solid carrier material of the layer (B) comprises a grain size of 200 to 3,000 µm, preferably 230-2,000 µm, more preferred 250-1,000 µm, particularly preferred 300-800 µm, most preferred 350-600 µm.

(23) Filter medium according to one of the embodiments (1)-(22), wherein the permanganate salt with which the solid carrier material of the layer (B) is impregnated is selected from sodium permanganate ($NaMnO_4$), potassium permanganate ($KMnO_4$), magnesium permanganate ($Mg(MnO_4)_2$), calcium permanganate ($Ca(MnO_4)_2$), barium permanganate ($Ba(MnO_4)_2$), lithium permanganate ($LiMnO_4$), and a combination thereof.

(24) Filter medium according to embodiment (23), wherein the permanganate salt with which the solid carrier material of the layer (B) is impregnated is selected from sodium permanganate ($NaMnO_4$), potassium permanganate ($KMnO_4$), and a combination thereof.

(25) Filter medium according to one of the embodiments (1)-(24), wherein the solid carrier material of the layer (B) comprises a degree of impregnation of 1 to 30 wt %.

(26) Filter medium according to embodiment (25), wherein the solid carrier material of the layer (B) comprises a degree of impregnation of 2 to 20 wt %, preferably 3 to 15 wt %, particularly preferred 4 to 12 wt %.

(27) Filter medium according to one of the embodiments (1)-(26), wherein the solid carrier material of the layer (B) comprises a grammage of 50 to 600 g/m$^2$.

(28) Filter medium according to embodiment (27), wherein the solid carrier material of the layer (B) has a grammage of 100 to 500 g/m$^2$, preferably 150 to 400 g/m$^2$, more preferred 200 to 300 g/m$^2$.

(29) Filter medium according to one of the embodiments (1)-(28), wherein the base with which the active carbon of the layer (C) is impregnated is a metal salt that contains as an anion an anion that is selected from hydroxide, carbonate, and a combination thereof.

(30) Filter medium according to embodiment (29), wherein the base with which the active carbon of the layer (C) is impregnated is selected from potassium hydroxide (KOH), sodium hydroxide (NaOH), potassium carbonate ($K_2CO_3$), sodium carbonate ($Na_2CO_3$), and a combination thereof.

(31) Filter medium according to one of the embodiments (29) or (30), wherein the base with which the active carbon of the layer (C) is impregnated is selected from potassium hydroxide (KOH), potassium carbonate ($K_2CO_3$), and a combination thereof.

(32) Filter medium according to one of the embodiments (1)-(31), wherein the alkaline impregnated active carbon of the layer (C) comprises a degree of
impregnation of 1 to 30 wt %.

(33) Filter medium according to embodiment (32), wherein the alkaline impregnated active carbon of the layer (C) comprises a degree of impregnation of 5 to 20 wt %, preferably 10 to 15 wt %.

(34) Filter medium according to one of the embodiments (1)-(33), wherein the layer (C) comprises a grammage of 50 to 600 g/m$^2$.

(35) Filter medium according to embodiment (34), wherein the layer (C) has a grammage of 100 to 500 g/m$^2$, preferably 150 to 400 g/m$^2$, more preferred 200 to 300 g/m$^2$.

(36) Filter medium according to one of the embodiments (1)-(35), wherein the alkaline impregnated active carbon of the layer (C) has a grain size of 10 to 80 mesh.

(37) Filter medium according to embodiment (35), wherein the alkaline impregnated active carbon of the layer (C) has a grain size of 30 to 60 mesh.

(38) Filter medium according to one of the embodiments (1)-(37), wherein the alkaline impregnated active carbon in layer (C) comprises a BET surface area of 300-1,500 m$^2$/g, in particular 500-1,500 m$^2$/g.

(39) Filter medium according to one of the embodiments (1)-(38), wherein the filter medium comprises a further layer (D), wherein the layer (D) is selected from
(i) a layer that comprises acid impregnated active carbon,
(ii) a layer that comprises potassium iodide impregnated active carbon, and
(iii) a layer that comprises textile flat material comprised of natural fibers, synthetic polymer fibers, or a combination thereof, and
(iv) a layer that is a combination of two or more of the layers (i), (ii), or
(iii).

(40) Filter medium according to the embodiment (39), wherein the layer (D) is arranged such that a gas flowing through the filter medium flows through the layer (D) as the first layer or as the last layer of the filter medium.

(41) Filter medium according to embodiment (39) or (40), wherein the textile flat material is a woven fabric, a knitted fabric, a knotted fabric, or a nonwoven.

(42) Filter medium according to the embodiment (39) or (40), wherein the layer (D) comprises a layer that comprises acid impregnated active carbon, wherein the acid is selected from phosphoric acid ($H_3PO_4$) and/or sulfuric acid ($H_2SO_4$).

(43) Filter medium according to one of the embodiments (1)-(42), wherein the filter medium comprises a total thickness of 6 mm or less, preferably 5 mm or less, more preferred 4 mm or less, and most preferred 3.5 mm or less.

(44) Filter media body, comprising a filter medium according to one of the embodiments (1)-(43), and at least one lateral band and/or at least one head band.

(45) Filter element comprising (i) a filter media body according to embodiment (44) or a filter medium according to one of the embodiments (1)-(43) and (ii) a frame, at least one holding element and/or at least one seal.

(46) Air filter comprising a housing and a filter element according to embodiment (45), a filter media body according to embodiment (44) or a filter medium according to one of the embodiments (1)-(43).

(47) Method for producing a filter medium comprising three layers (A) to (C) according to one of the embodiments (1)-(43), comprising the steps: (i) applying a layer (A) comprising active carbon;
(ii) applying a layer (B) comprising a solid carrier material that is impregnated with a permanganate salt;
(iii) applying a layer (C) comprising an alkaline impregnated active carbon;
when the layer (A) is arranged such that a gas flowing through the filter medium flows through the layer (A) before flowing though the layer (B); or comprising the steps
(i) applying a layer (B) comprising a solid carrier material that is impregnated with a permanganate salt;
(ii) applying a layer (C) comprising an alkaline impregnated active carbon;
(iii) applying a layer (A) comprising active carbon,
when the layer (A) is arranged such that a gas flowing through the filter medium flows through the layer (A) after flowing through the layer (C); so that
the layers (B) and (C) are arranged such that a gas flowing through the filter medium flows through the layer (B) before flowing through the layer (C)
the layer (A) is arranged such that a gas flowing through the filter medium flows through the layer (A) before flowing through the layer (B) or through the layer (A) after flowing through the layer (C).

(48) Method for producing a filter medium according to embodiment (47), wherein each of the layers (A) to (C) comprises a different composition.

(49) Method for producing a filter medium according to embodiment (47) or embodiment (48), wherein at least one further layer (D) is applied to the layer of the layers (A) to (C) that has been applied first or last.

(50) Use of a filter medium according to one of the embodiments (1)-(43). of a filter media body according to embodiment (44), of a filter element according to embodiment (45), or an air filter according to embodiment (46) in a device for purifying ambient air.

(51) Use according to embodiment (50), wherein the device for purifying ambient air is arranged in an air conditioning device, a venting device, a ventilation system or a fuel cell, in particular a fuel cell air filter, in particular a fuel cell cathode air filter.

DESCRIPTION OF PREFERRED EMBODIMENTS

In the following, the invention will be described in detail. In the context of the present application, the terms for describing the invention listed in the following will be used. These terms are known to a person of skill in the art and are used in the meaning explained in the following.

The term "nitrogen oxides" is used in the context of the present application to refer to all known oxides of the nitrogen, in particular nitrogen monoxide (NO) and nitrogen dioxide ($NO_2$) but also dinitrogen monoxide ($N_2O$), dinitrogen trioxide ($N_2O_3$) and dinitrogen tetroxide ($N_2O_4$). These oxides of nitrogen are in dynamic equilibrium with each other, i.e., when one of these nitrogen oxides is present, in general also the other mentioned nitrogen oxides are formed, even though the dynamic equilibrium in general lies clearly on the side of the nitrogen dioxide ($NO_2$) so that the other nitrogen oxides in many cases are present only in comparatively minimal quantities.

The term "active carbon", in particular in relation to the non-impregnated active carbon, refers in the context of the present application to carbon with highly porous, open pore structure. The specific surface area that can be determined by BET measurements, i.e., by gas adsorption measurements, amounts typically to 300 $m^2$/g or more. Typically, active carbon is present in finely divided form, in particular in order to provide a larger specific surface area. Active carbon can be produced from carbon-containing raw materials by coking and subsequent or simultaneous activation. In this context, "activation" refers to methods that serve for enlarging the porosity and thus the inner surface area and are typically divided into gas activation and chemical activation. In case of gas activation, already coked material is used and exposed to the oxidizing effect of a gas stream, for example, steam, carbon dioxide, air or their mixtures. The activation temperature lies at approximately 700-1,000° C., wherein the carbon according to the steam-carbon reaction is partially combusted and a porous highly active carbon lattice is thus created. In the chemical activation, mostly uncoked carbon-containing material is first mixed with dehydrating and oxidizing chemicals. Subsequently, the mixture is heated to 400-800° C. The activation agents (e.g. zinc chloride, phosphoric acid or sulfuric acid) are subsequently washed out and recycled. The activation can be done generally in rotary furnaces, shelf furnaces, shaft furnaces, fluidized bed furnaces, fluidized bed reactors or fluidized reactors etc.

An impregnated active carbon differs in respect to a chemical (e.g. an acid or base) being applied onto the active carbon in a separate method step after gas activation.

The term "grain size" of a particulate solid material that can be, for example, an impregnated or non-impregnated carrier is understood in the context of this application as a particle fraction that can be obtained by screening from a particle mixture with larger particle size distribution. "Grain size" is therefore indicated in general as a grain size range whose upper and lower limits are defined by the mesh width of the screens of a screen cascade between which the indicated particle fraction is collected during screening. For example, the grain size 30-80 mesh refers to the particle fraction that is collected upon screening below a screen with 30 meshes per inch (30 mesh) to a screen with 80 mesh per inch (80 mesh).

The term "degree of impregnation" refers in the context of this application to the load of a carrier (e.g., active carbon or $Al_2O_3$) with an impregnation agent (e.g., a permanganate salt or a base such as NaOH). The degree of impregnation (values in percentage by weight, wt %) can be calculated in correspondence with the equation $$\text{degree of impregnation} = \frac{m(\text{impregnation agent})}{m(\text{carrier}) + m(\text{impregnation agent})}$$

as weight percentage, wherein
m (impregnation agent)=mass of the employed impregnation agent, and
m (carrier)=mass of the employed carrier material.

The term "chemisorption" is understood in the context of this application as the adsorption of molecules, in particular from a gas mixture, at the surface of a carrier material with formation of a chemical bond. A molecule, depending on its chemical properties, can form at least one type of chemical bond, e.g., an ionic, covalent, or hydrogen bond, preferably a covalent bond.

The filter medium according to the invention comprises at least three layers which will be described in the following in detail.

Layer (A)

Layer (A) comprises active carbon. In an embodiment, the layer (A) comprises a grammage of 50 to 600 $g/m^2$, in particular of 100 to 500 $g/m^2$, preferably 150 to 400 $g/m^2$, more preferred 200 to 300 $g/m^2$. The grammage to be used can be varied depending on the strength of the desired adsorptive properties of the active carbon (inter alia dependent on its grain size).

In a further embodiment, the layer (A) comprises a grain size of 10 to 80 mesh, preferably of 30 to 60 mesh. The grain size of the active carbon can be controlled by suitable selection of the starting material for producing the active carbon and/or the type of activation and can be adjusted in particular by grinding and screening.

In a further embodiment, the layer (A) comprises a BET surface area of 500 to 1,500 $m^2$/g. The BET surface area of the active carbon can be controlled by suitable selection of the starting material for producing the active carbon and/or the type of activation.

Grammage, grain size and/or BET surface area of the active carbon in layer (A) can be varied in order to adjust the adsorption capacity of the layer (A). In the layer (A), a physisorption as strong as possible of undesirable molecular components of a gas mixture flowing therethrough takes place (in particular of ozone, volatile organic hydrocarbons (e.g. CO or n-butane), $SO_2$, $H_2S$, $NH_3$ or formaldehyde).

Layer (B)

Layer (B) comprises a solid carrier material that is impregnated with a permanganate salt. In an embodiment, the solid carrier material of the layer (B) is selected from aluminum oxide ($Al_2O_3$), silica gel ($SiO_2$), zirconium oxide ($ZrO_2$), titanium oxide ($TiO_2$), zeolite, kaolin, clay, bauxite, and a combination thereof. In a preferred embodiment, the solid carrier material of the layer (B) is aluminum oxide ($Al_2O_3$). The selection of a suitable solid carrier material can depend inter alia on the impregnation agent and the degree of impregnation.

In a further embodiment, the solid carrier material of the layer (B) comprises a grain size of 100 to 5,000 μm. In a further embodiment, the carrier material comprises a grain size between 200 to 3,000 μm, preferably 300-2,000 μm, more preferred 250-1,000 μm, particularly preferred 350-800 μm, most preferred 350-600 μm.

The impregnation agent for the solid carrier material of the layer (B) is a permanganate salt that is selected from sodium permanganate ($NaMnO_4$), potassium permanganate ($KMnO_4$), magnesium permanganate ($Mg(MnO_4)_2$), calcium permanganate ($Ca(MnO_4)_2$), barium permanganate ($Ba(MnO_4)_2$), lithium permanganate ($LiMnO_4$), and a combination thereof, wherein the commercially available and more cost-efficient compounds sodium permanganate ($NaMnO_4$) and/or potassium permanganate ($KMnO_4$) are preferred. Impregnated solid carrier materials are commercially obtainable. The solid carrier material of the layer (B) can be impregnated, depending on the need, with a permanganate salt or a plurality of permanganate salts. The more soluble the permanganate salt is in water, the more preferred it is in general as an impregnation agent in layer (B). Moreover, the application of a permanganate salt is preferred with which a degree of impregnation as high as possible can be achieved. Thus, on aluminum oxide ($Al_2O_3$), potassium permanganate ($KMnO_4$) is preferred and sodium permanganate ($NaMnO_4$) is particularly preferred.

US 2015/0314262 A1 describes in addition various methods for impregnation of a solid carrier material with a permanganate salt.

The solid carrier material comprises a degree of impregnation of 1 to 30 wt %, in particular 2 to 20 wt %, preferably 3 to 15 wt %, particularly preferred 4 to 12 wt %. A suitable degree of impregnation is selected in respect to the employed solid carrier material.

In an embodiment, the solid carrier material of the layer (B) comprises a grammage of 50 to 600 $g/m^2$, in particular of 100 to 500 $g/m^2$, preferably 150 to 400 $g/m^2$, more preferred 200 to 300 $g/m^2$.

Undesirable molecular components of the air are oxidized at layer (B). In particular, for example, NO is oxidized at layer (B) to $NO_2$. Since oxides of nonmetals such as nitrogen and sulfur in general exhibit acidic properties and thus react with alkaline materials, a chemisorption at the alkaline impregnated layer (C) is possible in a particularly advantageous way due to the oxidation at layer (B). The oxidation capacity of the layer (B) can be controlled, for example, by the grammage and the degree of impregnation.

Layer (C)

The layer (C) comprises an alkaline impregnated active carbon. The base is a metal salt that contains as an anion an anion that is selected from hydroxide, carbonate, and a combination thereof. In a preferred embodiment, the base is selected from potassium hydroxide (KOH), sodium hydroxide (NaOH), potassium carbonate ($K_2CO_3$), sodium carbonate ($Na_2CO_3$), and a combination thereof. Particularly preferred in this context are the commercially available and inexpensive bases potassium hydroxide (KOH) and/or potassium carbonate ($K_2CO_3$). The active carbon of the layer (C), as needed, can be impregnated with one base or a plurality of bases. The better soluble the base is in water, the more preferred it is in general as an impregnation agent in the layer (C).

The active carbon comprises a degree of impregnation of 1 to 30 wt %, in particular 5 to 20 wt %, preferably 10 to 15 wt %.

In an embodiment, the active carbon of the layer (C) comprises a grammage of 50 to 600 $g/m^2$, in particular of 100 to 500 $g/m^2$, preferably 150 to 400 $g/m^2$, more preferred 200 to 300 $g/m^2$. The grammage to be employed can be varied depending on the strength of the desired adsorptive properties of the impregnated active carbon (inter alia depending on its degree of impregnation).

In a further embodiment, the layer (C) comprises a grain size of 10 to 80 mesh, preferably of 30 to 60 mesh. The grain size of active carbon can be controlled by suitable selection of the starting material for producing the active carbon and/or the type of activation and can be adjusted in particular by grinding and screening.

In a further embodiment, the layer (C) comprises a BET surface area of 500 to 1,500 $m^2/g$. The BET surface area of the active carbon can be controlled by a suitable selection of the starting material for producing the active carbon and/or by the type of activation.

Moreover, the use of a base is preferred with which a degree of impregnation as high as possible can be achieved. This can be achieved in addition in that the active carbon comprises a specific surface area as high as possible and a method for impregnation (e.g. wet or spray methods) is repeated multiple times with fresh base solution. In the wet method, the active carbon during its activation (in particular during gas activation) can be supplied with an aqueous solution of a suitable base of a defined concentration and subsequently heated. During heating, the undesirably adsorbed water molecules are removed from the active carbon surface. In contrast thereto, in the spray method an aqueous solution of a suitable base of a defined concentration is sprayed onto the active carbon.

Undesirable molecular components of the gas stream that have already flowed through the layer (B) and exhibit acidic properties are separated at the layer (C). In particular, $NO_2$ but also $SO_2$ and $SO_3$ are separated in the presence of impregnated base molecules of the layer (C).

It is therefore desirable to cover the surface of the active carbon as efficiently as possible with base molecules. By a high coverage of the surface, i.e., a high degree of impregnation, the capability of chemisorption of acidic harmful gas molecules can be increased, on the one hand, and, in addition, a reducing property of the active carbon that is undesirable in this layer can be minimized or completely suppressed. Accordingly, the undesirable reduction of harmful gases, whose acidic properties are to be used for chemisorption by the base with which the active carbon of the layer (C) is impregnated, can be suppressed.

Agent for Stabilization

The agent for stabilization serves to stabilize the flat arrangement of the carrier material (impregnated or non-impregnated active carbon; solid carrier material impregnated with permanganate salt) against mechanical action and to immobilize the carrier material.

In an embodiment, one, two or each of the layers (A) to (C) comprises an agent for stabilization. In a further embodiment, two or more of the layers (A) to (C) comprise an agent for stabilization, and the same agent for stabilization or different agents for stabilization are present in the two or more layers. In a preferred embodiment, each of the layers (A) to (C) comprises an agent for stabilization. In an embodiment, the agent for stabilization is selected from an adhesive, a carrier layer, and a combination thereof. The quantity and/or the type of the agent for stabilization should be selected such that a pressure loss of the gas flowing through the filter medium is substantially avoided. The agent for stabilization should therefore be an air permeable agent. In a preferred embodiment, the carrier layer is a textile carrier layer. In a particularly preferred embodiment, the textile carrier layer is a non-woven. In a further preferred embodiment, the nonwoven is comprised of polymer fibers. Preferred polymer components of the nonwoven can be selected from polyurethane, polyester, polypropylene, polyethylene, polyamide, polyacrylonitrile, polycarbonate, and combinations thereof.

The selection of a suitable agent for stabilization can be done depending on the properties of the layer (A), (B) and/or (C) to be stabilized, in particular as a function of chemical and physical parameters such as grammage, grain size, BET surface area, composition, impregnation, or degree of impregnation. Moreover, the selection of a suitable agent of stabilization can depend on the quantity of the carrier material (impregnated or non-impregnated active carbon; solid carrier material impregnated with permanganate salt) on a certain layer. Depending on the need, an individual layer can be sufficient for stabilization or one or a plurality of agents for stabilization are combined.

Optional Layer D

According to a further embodiment, the filter medium can comprise at least one further layer that comprises acid-impregnated active carbon, potassium iodide impregnated active carbon, a textile flat material or a combination thereof.

A further layer can thus comprise acid-impregnated active carbon wherein the acid is selected in particular from phosphoric acid ($H_3PO_4$), sulfuric acid ($H_2SO_4$), and a combination thereof. The acid impregnation serves, for example, for the targeted removal of alkaline gases such as ammonia or amines.

Moreover, a further layer can comprise a potassium iodide impregnated active carbon which is suitable for the targeted removal of harmful gases such as hydrogen sulfide ($H_2S$) and mercaptans.

A further layer can comprise a textile flat material that is comprised of natural fibers, synthetic polymer fibers, or a combination thereof. This layer serves for removal of particles from the gas flowing through. In this context, the textile flat material can be a woven fabric, a knitted fabric, a knotted fabric, or a nonwoven.

Filter Medium

The layers (B) and (C) are arranged in the filter medium such that a gas flowing through the filter medium flows through the layer (B) before flowing through the layer (C). Due to this specific feature, harmful gases can be removed in a highly efficient manner from the ambient air. In this context, harmful gases (e.g. NO) are first oxidized (e.g. $NO_2$) in layer (B) and subsequently efficiently separated on the alkaline impregnated active carbon of the layer (C). The separation is realized preferably by chemisorption. A targeted and efficient removal of undesirable acidic gases (such as nitrogen oxides) from the air is achieved.

The layer (A) is arranged such that a gas flowing through the filter medium flows through the layer (A) before flowing through the layer (B) or through the layer (A) after flowing through the layer (C).

In an embodiment, the layer (A) in the filter medium is arranged at the outflow side (gas flows through layer (A) after flowing through layers (B) and (C)). In this arrangement, it can be avoided that components of the gas stream that are undesirable and therefore to be separated are first reduced by contact with active carbon of layer (A) and then, upon passing through the layer (B), must be oxidized again so as to be able to be chemisorbed in layer (C). The oxidative capacity of the layer (B) can thus be more efficiently used and the service life of the layer (B) can be increased.

In a preferred embodiment, the layer (A) in the filter medium is arranged at the inflow side (gas flows through layer (A) before flowing through layers (B) and (C)). In this arrangement, harmful gases can be separated at least partially before the gas flow reaches the layers (B) and (C). In this case also, the capacity of the layers (B) and (C) can thus be utilized efficiently for such harmful gases which cannot be adsorbed in the layer (A) so that the service life of the layers (B) and (C) can be increased.

In a further embodiment, each of the layers (A) to (C) comprises a different composition. Due to this feature, in particular a targeted sequence of the reactions is achieved whereby the harmful gases are converted layer by layer to harmful gas intermediates and finally are separated irreversibly at layer (C). In this way, undesirable and counterproductive side reactions can be avoided.

Figure 1:
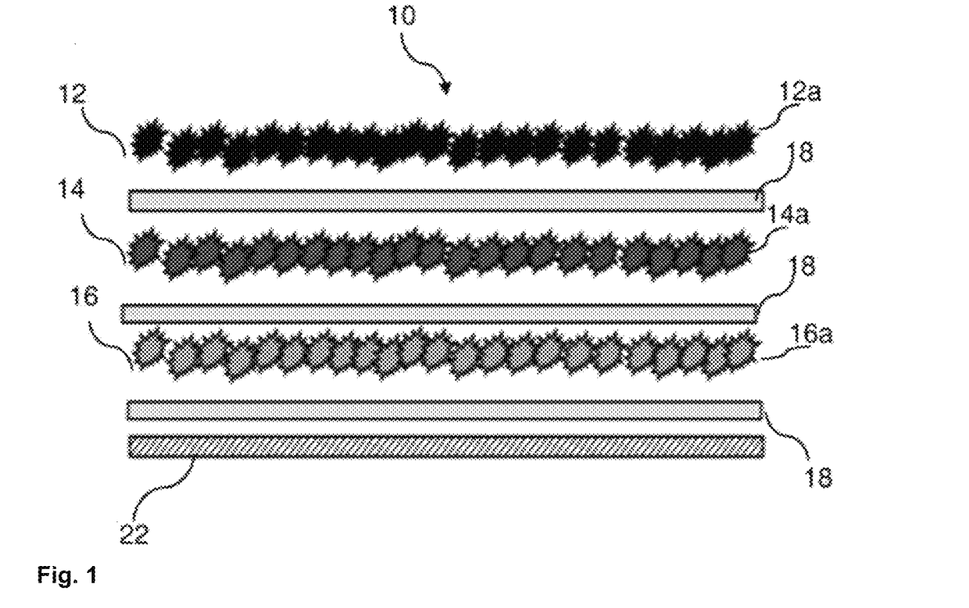
FIG. 1 shows a greatly simplified section view of a filter medium according to an embodiment of the present application.

In FIG. 1, a filter medium 10 according to an embodiment of the invention is illustrated, in particular for an air filter, in particular for an interior filter or for a fuel cell, wherein the filter medium comprises an outer layer (A) 12 that comprises active carbon particles 12a; a second middle layer (B) 14 which comprises particles of solid carrier material that is impregnated with a permanganate salt 14a; and a third outer layer (C) 16 that comprises alkaline impregnated active carbon particles 16a. The active carbon particles 12a of the layer (A) 12 of the filter medium 10, as illustrated schematically in FIG. 1, can be immobilized by addition of an agent for stabilization 18, for example, an adhesive. The adhesive 18 can be based on polyurethane. The active carbon particles 12a of the layer (A) 12 can have a grammage of 50 to 600 g/m², in particular of 100 to 500 g/m², preferably 150 to 400 g/m², more preferred 200 to 300 g/m². The layer (A) 12 enables advantageously a preseparation of harmful gases from the ambient air. However, in layer (A) a reduction of $NO_2$ to NO can take place.

The particles of solid carrier material that are impregnated with a permanganate salt 14a of the second middle layer (B) 14 of the filter medium 10 can also be immobilized, as schematically illustrated in FIG. 1, by the addition of an agent for stabilization 18, for example, an adhesive. The adhesive 18 can be, for example, based on polyurethane. The middle layer (B) 14 comprises solid carrier material particles impregnated with permanganate salt at which inter alia nitrogen monoxide molecules (NO) are oxidized to nitrogen dioxide molecules ($NO_2$). For example, the degree of impregnation can be 1 to 30 wt %, in particular 2 to 20 wt %, preferably 3 to 15 wt %, particularly preferred 4 to 12 wt %.

Particularly advantageously, the particles 14a of the middle layer 14 can have a grammage of 50 to 600 g/m², in particular of 100 to 500 g/m², preferably 150 to 400 g/m², more preferred 200 to 300 g/m².

The alkaline impregnated active carbon particles 16a of the third layer (C) 16 can also be immobilized, as schematically illustrated in FIG. 1, by addition of an agent for stabilization 18, for example, an adhesive. The adhesive 18 can advantageously be based on polyurethane. The third layer (C) 16 comprises alkaline impregnated active carbon particles 16a at which nitrogen dioxide molecules ($NO_2$) can be separated by chemisorption. Compared to physisorption, the chemisorption enables in this context a chemical and thus stronger bond to the adsorbent agent so that harmful gases (in particular nitrogen oxides) are advantageously bonded.

Particularly advantageously, the particles 16a of the third layer (C) 16 can have a grammage of 100 to 500 g/m², preferably 150 to 400 g/m², more preferred 200 to 300 g/m².

The filter medium 10 can comprise in addition a carrier layer 22, in particular a textile carrier layer 22, in particular a carrier layer 22 embodied of nonwoven.

Figure 2:
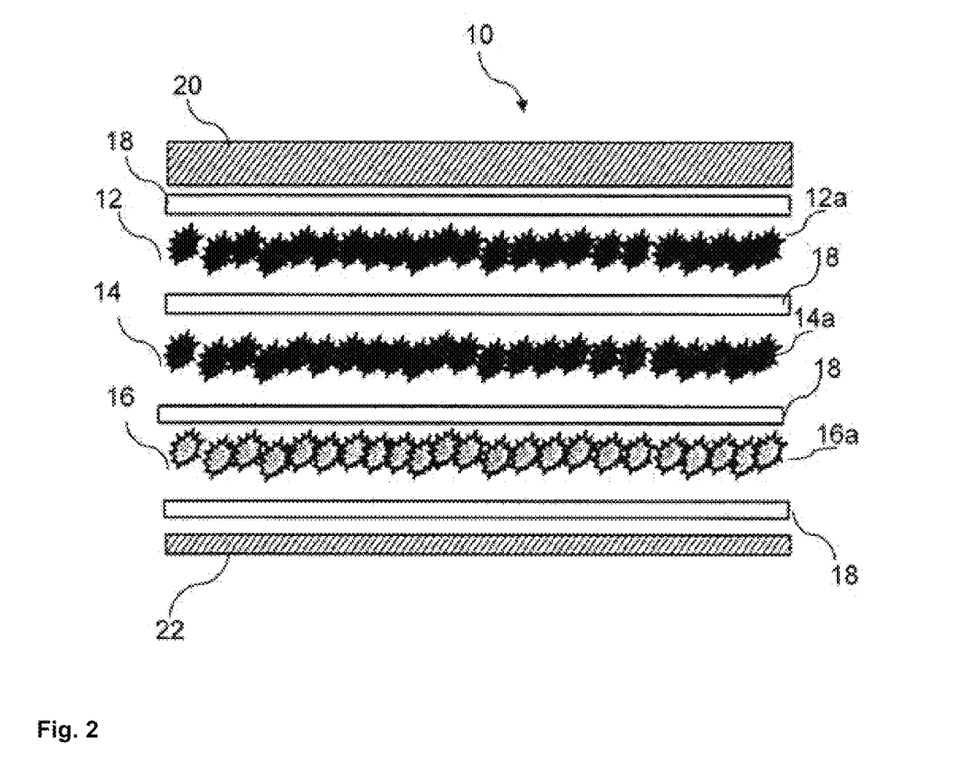
FIG. 2 shows a filter medium corresponding substantially to that illustrated in FIG. 1 and comprising in addition a particle filter layer.

The filter medium illustrated in FIG. 2 corresponds substantially to the filter medium illustrated in FIG. 1. The filter medium 10 comprises in addition a particle filter layer 20 that can be embodied in particular as one or a plurality of nonwoven layer(s).

Figure 3:
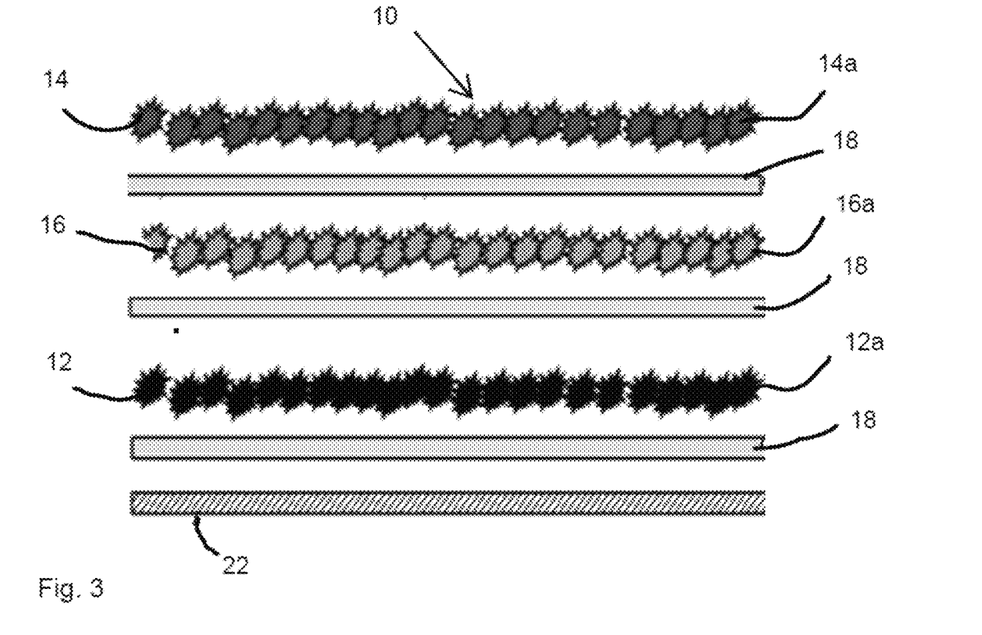
FIG. 3 shows a greatly simplified section view of a filter medium according to an alternative embodiment of the present application.

In FIG. 3, a filter medium 10 according to an alternative embodiment of the invention is illustrated, in particular for an air filter, in particular for an interior filter or for a fuel cell, wherein the filter medium comprises a first outer layer (B) 14 which comprises particles of solid carrier material that is impregnated with a permanganate salt 14a; a second middle layer (C) 16 that comprises alkaline impregnated active carbon particles 16a; and a third inner layer (A) 12 that comprises active carbon particles 12a.

As a result, the layer (B) 14 and the layer (C) 16 are arranged such that a gas flowing through the filter medium 10 flows through the layer (B) 14 before flowing through the layer (C) 16, and further, the layer (A) 12 is arranged such that the gas flowing through the filter medium 10 flows through the layer (A) 12 after flowing through the layer (C) 16.

As previously described, the particles of solid carrier material that are impregnated with a permanganate salt 14a of the outer layer (B) 14 of the filter medium 10 can be immobilized, as schematically illustrated in FIG. 3, by the addition of an agent for stabilization 18, for example, an adhesive. The adhesive 18 can be, for example, based on polyurethane. The outer layer (B) 14 comprises solid carrier material particles impregnated with permanganate salt 14a at which inter alia nitrogen monoxide molecules (NO) are oxidized to nitrogen dioxide molecules ($NO_2$). For example, the degree of impregnation can be 1 to 30 wt %, in particular 2 to 20 wt %, preferably 3 to 15 wt %, particularly preferred 4 to 12 wt %.

Particularly advantageously, the particles 14a of the outer layer 14 can have a grammage of 50 to 600 g/m², in particular of 100 to 500 g/m², preferably 150 to 400 g/m², more preferred 200 to 300 g/m².

The alkaline impregnated active carbon particles 16a of the middle layer (C) 16 can also be immobilized, as schematically illustrated in FIG. 3, by addition of an agent for stabilization 18, for example, an adhesive. The adhesive 18 can advantageously be based on polyurethane. The middle layer (C) 16 comprises alkaline impregnated active carbon particles 16a at which nitrogen dioxide molecules ($NO_2$) can be separated by chemisorption. Compared to physisorption, the chemisorption enables in this context a chemical and thus stronger bond to the adsorbent agent so that harmful gases (in particular, nitrogen oxides) are advantageously bonded.

Particularly advantageously, the particles 16a of the middle layer (C) 16 can have a grammage of 100 to 500 g/m², preferably 150 to 400 g/m², more preferred 200 to 300 g/m².

The active carbon particles 12a of the third layer (A) 12 of the filter medium 10, as illustrated schematically in FIG. 3, can also be immobilized by addition of an agent for stabilization 18, for example, an adhesive. The adhesive 18 can be based on polyurethane. The active carbon particles 12a of the third layer (A) 12 can have a grammage of 50 to 600 g/m², in particular of 100 to 500 g/m², preferably 150 to 400 g/m², more preferred 200 to 300 g/m².

The filter medium 10 can comprise in addition a carrier layer 22, in particular a textile carrier layer 22, in particular a carrier layer 22 embodied of nonwoven.

Filter Media Body

The filter media body comprises a filter medium according to the invention and at least one lateral band and/or at least one head band. In an embodiment, the filter media body is embodied as a coil body, layered as flat filter, or folded as filter bellows.

Filter Element

The filter element comprises a filter media body according to the invention and/or comprises a filter medium according to the invention, and a frame, at least one holding element, and/or at least one seal.

Air Filter

The air filter comprises a filter media body according to the invention and/or a filter medium according to the invention.

Method for Producing a Filter Medium

A method for producing a filter medium according to the invention, comprising the steps: applying a layer (A) comprising active carbon, applying a layer (B) comprising a solid carrier material that is impregnated with a permanganate salt, applying a layer (C) comprising an alkaline impregnated active carbon, when the layer (A) is arranged such that a gas flowing through the filter medium flows through the layer (A) before flowing through the layer (B), or a method for producing a further filter medium according to the invention, comprising the steps: applying a layer (B) comprising a solid carrier material that is impregnated with a permanganate salt, applying a layer (C) comprising an alkaline impregnated active carbon, applying a layer (A) comprising active carbon, when the layer (A) is arranged such that a gas flowing through the filter medium flows through the layer (A) after flowing through the layer (C), so that the layers (B) and (C) are arranged such that a gas flowing through the filter medium flows through the layer (B) before flowing through the layer (C), the layer (A) is arranged such that a gas flowing through the filter medium flows through the layer (A) before flowing through the layer (B) or through the layer (A) after flowing through the layer (C).

In an embodiment, each of the applied layers (A) to (C) comprises a different composition.

A further method for producing a filter medium according to the invention, wherein at least one further layer (D) is applied onto the layer applied first and the layer applied last, or at least one further layer (D) is applied to the layer that has been applied first or last.

Use

A filter medium according to the invention, a filter media body according to the invention, a filter element according to the invention, or an air filter according to the invention can be used in a device for purifying ambient air. In preferred embodiments, the device can be an outdoor air purifier or an ambient air purifying device, air conditioning device, venting device, a ventilation system or a fuel cell, in particular a fuel cell air filter, in particular a fuel cell cathode air filter.

EXAMPLES

Example 1

Filter Medium Containing Three Adsorption Agents in Three-Layer Construction

Three adsorbent agents are provided: (a) active carbon, (b) aluminum oxide impregnated with potassium permanganate, and (c) alkaline impregnated active carbon.

The active carbon contained in the adsorbent agents (a) and (c) is a steam-activated active carbon (grain size 30-60 mesh, specific surface area 1,000 m$^2$/g). The adsorbent agent (a) is comprised of this active carbon that is used without any further pretreatment.

For producing the adsorbent agent (b), aluminum oxide was impregnated with an aqueous solution of potassium permanganate ($KMnO_4$).

The thus obtained adsorbent agent comprises a degree of impregnation of 6%. Up to the point of use, the adsorbent agent was stored under the following conditions: 23° C., 50% RH.

For producing the adsorbent agent (c), the active carbon was impregnated with an aqueous solution of potassium carbonate.

The thus obtained impregnated active carbon comprise a degree of impregnation of 10 m %. Up to the point of use, the impregnated active carbon was stored under the following conditions: 23° C., 50% RH.

From these adsorbent agents (a)-(c), a filter medium with a three-layer construction was produced in that a layer of the adsorbent agent (a) with a grammage of 400 g/m$^2$, a layer of the adsorbent agent (b) with a grammage of 1,300 g/m$^2$, and a layer of the adsorbent agent (c) with a grammage of 400 g/m$^2$ was applied respectively onto a porous carrier with a diameter of 185 mm. The porous carriers with the layer of the respective adsorbent agent were arranged on top of each other such that the adsorbent agents could be flowed through in the sequence (a)→(b)→(c), i.e., as illustrated in FIG. 1.

In order to examine the adsorption properties of the thus formed filter medium, the filter medium was inserted in a testing stand and first conditioned by heating to 80° C. for 15 minutes while the test gas mixture was allowed to flow through the filter medium. As a test gas, air at a temperature of 23±1° C. and a relative humidity of 50±3% was used to which had been added 15±1 ppm nitrogen monoxide (NO) and 15±1 ppm nitrogen dioxide ($NO_2$).

After conditioning, this test gas was allowed to flow through the filter medium at a rate of 10 cm/s (±2%) during a test period of 60 minutes. The pressure loss across the filter medium and the concentration of the total nitrogen oxides ($NO_x$) and of the nitrogen monoxide (NO) in the outflowing test gas (i.e., after passing through the filter medium) were measured in parallel (FTIR), wherein measured values were recorded every 10 seconds across the entire test period. The concentration of the nitrogen dioxide ($NO_2$) was calculated as the difference of the concentration of the total nitrogen oxides ($NO_x$) and the concentration of the nitrogen monoxide (NO). The adsorbed quantity of the nitrogen dioxide ($NO_2$) and of the nitrogen monoxide (NO) is calculated based on the volume flow, the concentration of the nitrogen dioxide ($NO_2$) and of the nitrogen monoxide (NO) in the outflowing test gas, and the molecular mass of the nitrogen dioxide ($M(NO_2)$=46.01 g/mol) and of the nitrogen monoxide ($M(NO)$=30.01 g/mol). If nothing else is described here, all test conditions and parameters are selected in accordance with ISO-11155-2.

The results are represented in Table 1. The concentration of nitrogen monoxide and nitrogen dioxide are indicated in percent relative to the concentration of the respective gas before flowing through the filter medium. Since nitrogen dioxide when contacted with active carbon reacts partially to nitrogen monoxide, in some cases relative concentrations of nitrogen monoxide of more than 100% are observed in the outflowing test gas.

Comparative Example 1

Filter Medium Containing Three Adsorbent Agents in Mixture in Single-Layer Construction By using the adsorbent agents (a)-(c) as described in Example 1, a single-layer filter medium was produced. For this purpose, a layer with a grammage of 2,100 g/m$^2$ of a homogenous mixture of 400 parts by weight of the adsorbent agent (a), 1,300 parts by weight of the adsorbent agent (b), and 400 parts by weight of the adsorbent agent (c) was formed on a porous carrier with a diameter of 185 mm.

The thus formed filter medium was inserted in a testing stand, conditioned, and its adsorption properties examined as described in Example 1.

The results are represented in Table 1.

Comparative Example 2

Filter Medium Containing an Adsorbent Agent in a Single-Layer Construction

By use of the adsorbent (a) as described in Example 1, a single-layer filter medium was produced. For this purpose, a layer with a grammage of 2,100 g/m$^2$ of the adsorbent agent (a) was formed on a porous carrier with a diameter of 185 mm.

The thus formed filter medium was inserted in a testing stand, conditioned, and its adsorption properties examined as described in Example 1.

The results are represented in Table 1.

TABLE 1

Adsorption Properties of the Filter Media
Break through of NO and $NO_2$ at Different Measuring Times
Adsorption Quantity (NO/$NO_2$/total $NO_x$) after 60 Minutes

| | | Example 1 | | Comparative Example 1 | | Comparative Example 2 | |
|---|---|---|---|---|---|---|---|
| | time t [min] | NO [%] | $NO_2$ [%] | NO [%] | $NO_2$ [%] | NO [%] | $NO_2$ [%] |
| break-through at time t | 0 | 37 | 0 | 43 | 2.4 | 47 | 0 |
| | 5 | 56 | 0.4 | 62 | 4.5 | 69 | 0.6 |
| | 15 | 74 | 0.7 | 77 | 6.1 | 85 | 0.8 |
| | 30 | 91 | 1 | 89 | 9.5 | 98 | 1.0 |
| | 60 | 110 | 1.2 | 101 | 16.6 | 113 | 1.3 |
| adsorbed (t = 60 min) [mg] | | 23 | 272 | 25 | 250 | 11 | 276 |
| adsorbed $NO_x$ (t = 60 min) [mg] | | 295 | | 275 | | 287 | |

Surprisingly, it was found that the filter medium according to Example 1, i.e., a filter medium with three adsorption agents (a), (b), and (c) in a three-layer construction exhibits a significantly reduced $NO_2$ break-through (at the time t=60 minutes: 1.2% versus 16.6%, i.e., a concentration reduced by the factor (1.2/16.6=) 13) and is capable of adsorbing a greater quantity $NO_x$ (+7.3%) compared to the filter medium according to Comparative Example 1, i.e., a filter medium with three adsorption agents (a), (b), and (c) in mixture in a single-layer construction with the same total grammage.

What is claimed is:

1. A filter medium comprising:
   a layer (A) comprising non-impregnated active carbon,
   a layer (B) comprising a solid carrier material that is impregnated with a permanganate salt;
   a layer (C) comprising alkaline impregnated active carbon;
   wherein the layer (B) and the layer (C) are arranged such that a gas flowing through the filter medium flows through the layer (B) before flowing through the layer (C);
   wherein the layer (A) is arranged such that the gas flowing through the filter medium flows through the layer (A) before flowing through the layer (B) or the gas flowing through the filter medium flows through the layer (A) after flowing through the layer (C); and
   wherein the solid carrier material of the layer (B) is aluminum oxide ($Al_2O_3$).

2. The filter medium according to claim 1, wherein at least one of the layer (A), the layer (B), and the layer (C) comprises an agent for stabilization of the layer.

3. The filter medium according to claim 2, wherein, when two or three of the layer (A), the layer (B), and the layer (C) comprise the agent for stabilization of the layer, the same agent for stabilization of the layer is used in said two or three of the layer (A), the layer (B), and the layer (C).

4. The filter medium according to claim 2, wherein the agent for stabilization of the layer is selected from the group consisting of an adhesive, a carrier layer, and a combination thereof.

5. The filter medium according to claim 4, wherein the carrier is a nonwoven textile carrier layer, and wherein the nonwoven textile carrier layer is comprised of polymer fibers and the polymer of the polymer fibers is selected from the group consisting of polyurethane, polyester, polypropylene, polyethylene, polyamide, polyacrylonitrile, polycarbonate, and combinations thereof.

6. The filter medium according to claim 1, wherein:
   the layer (A) comprises no carrier material that is impregnated with a permanganate salt and comprises no alkaline impregnated active carbon;
   the layer (B) comprises a solid carrier material that is impregnated with a permanganate salt but comprises no non-impregnated active carbon and comprises no alkaline impregnated active carbon;
   the layer (C) comprises no carrier material that is impregnated with a permanganate salt and comprises no non-impregnated active carbon.

7. The filter medium according to claim 1, wherein:
   the layer (A) is comprised of the non-impregnated active carbon and of an agent for stabilization of the layer;
   the layer (B) is comprised of the solid carrier material that is impregnated with the permanganate salt and of an agent for stabilization of the layer;
   the layer (C) is comprised of the alkaline impregnated active carbon and of an agent for stabilization of the layer.

8. The filter medium according to claim 1, wherein at least one of the layer (A), the layer (B), and the layer (C) comprises a grammage of 50 to 600 $g/m^2$.

9. The filter medium according to claim 1, wherein the permanganate salt with which the solid carrier material of the layer (B) is impregnated is selected from the group consisting of sodium permanganate ($NaMnO_4$), potassium permanganate ($KMnO_4$), and a combination thereof.

10. The filter medium according to claim 1, wherein the non-impregnated active carbon of the layer (A) and/or the alkaline impregnated active carbon of the layer (C) comprises a grain size of 10 to 80 mesh.

11. The filter medium according to claim 1, wherein the non-impregnated active carbon of the layer (A) and/or the alkaline impregnated active carbon of the layer (C) comprises a BET surface area of 300-1,500 $m^2/g$.

12. The filter medium according to claim 1, wherein a base with which the alkaline impregnated active carbon of the layer (C) is impregnated is selected from the group consisting of potassium hydroxide (KOH), sodium hydroxide (NaOH), potassium carbonate ($K_2CO_3$), sodium carbonate ($Na_2CO_3$), and a combination thereof.

13. The filter medium according to claim 1, wherein the alkaline impregnated active carbon of the layer (C) comprises a degree of impregnation of 1 to 30 wt %.

14. An air filter comprising a filter medium according to claim 1.

15. A method for producing a filter medium according to claim 1, comprising the steps:
   applying the layer (A) comprising the non-impregnated active carbon;
   applying the layer (B) comprising the solid carrier material that is impregnated with the permanganate salt;
   applying the layer (C) comprising the alkaline impregnated active carbon; and
   arranging the layer (A) such that the gas flowing through the filter medium flows through the layer (A) before flowing through the layer (B);
   arranging the layer (B) and the layer (C) such that the gas flowing through the filter medium flows through the layer (B) before flowing through the layer (C).

16. A method for producing a filter medium according to claim 1, comprising the steps:
   applying the layer (B) comprising the solid carrier material that is impregnated with the permanganate salt;
   applying the layer (C) comprising the alkaline impregnated active carbon;
   applying the layer (A) comprising the non-impregnated active carbon;
   arranging the layer (A) such that the gas flowing through the filter medium flows through the layer (A) after flowing through the layer (C);
   arranging the layer (B) and the layer (C) such that the gas flowing through the filter medium flows through the layer (B) before flowing through the layer (C).

17. A filter medium comprising:
   a layer (A) comprising non-impregnated active carbon,
   a layer (B) comprising a solid carrier material that is impregnated with a permanganate salt;
   a layer (C) comprising alkaline impregnated active carbon;
   wherein the layer (B) and the layer (C) are arranged such that a gas flowing through the filter medium flows through the layer (B) before flowing through the layer (C);
   wherein the layer (A) is arranged such that the gas flowing through the filter medium flows through the layer (A) before flowing through the layer (B) or the gas flowing through the filter medium flows through the layer (A) after flowing through the layer (C);
   wherein at least one of the layer (A), the layer (B), and the layer (C) comprises an agent for stabilization of the layer; and wherein, when two or three of the layer (A), the layer (B), and the layer (C) comprise the agent for stabilization of the layer, said two or three of the layer (A), the layer (B), and the layer (C) comprise different agents for stabilization of the layer, respectively.

18. A filter medium comprising:
a layer (A) comprising non-impregnated active carbon,
a layer (B) comprising a solid carrier material that is impregnated with a permanganate salt;
a layer (C) comprising alkaline impregnated active carbon;
wherein the layer (B) and the layer (C) are arranged such that a gas flowing through the filter medium flows through the layer (B) before flowing through the layer (C);
wherein the layer (A) is arranged such that the gas flowing through the filter medium flows through the layer (A) before flowing through the layer (B) or the gas flowing through the filter medium flows through the layer (A) after flowing through the layer (C);
wherein at least one of the layer (A), the layer (B), and the layer (C) comprises agent for stabilization of the layer;
wherein the agent for stabilization of the layer selected from the group consisting of an adhesive, a carrier layer, and a combination thereof; and
wherein the carrier layer is a textile carrier layer.

* * * * *